US 12,156,116 B2

(12) United States Patent
Szász et al.

(10) Patent No.: US 12,156,116 B2
(45) Date of Patent: Nov. 26, 2024

(54) TECHNIQUE FOR USER PLANE TRAFFIC QUALITY ANALYSIS (71) Applicant: Telefonaktiebolaget LM Ericsson (publ), Stockholm (SE)

(72) Inventors: Ferenc Szász, Budapest (HU); Attila Báder, Paty (HU); Attila Mitcsenkov, Budapest (HU)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 634 days.

(21) Appl. No.: 17/312,840

(22) PCT Filed: Dec. 11, 2018

(86) PCT No.: PCT/EP2018/084357
§ 371 (c)(1),
(2) Date: Jun. 10, 2021

(87) PCT Pub. No.: WO2020/119891
PCT Pub. Date: Jun. 18, 2020

(65) Prior Publication Data
US 2022/0060963 A1    Feb. 24, 2022

(51) Int. Cl.
*H04W 40/12*    (2009.01)
*H04L 25/02*    (2006.01)
(Continued)

(52) U.S. Cl.
CPC ......... *H04W 40/12* (2013.01); *H04L 25/0254* (2013.01); *H04L 65/80* (2013.01); *H04W 24/10* (2013.01); *H04W 28/10* (2013.01)

(58) Field of Classification Search
CPC ..... H04W 40/12; H04W 24/10; H04W 28/10; H04L 25/0254; H04L 65/80
See application file for complete search history.

(56) References Cited

U.S. PATENT DOCUMENTS

| 8,587,630 B1 | 11/2013 | Krinsky et al. |
| 10,142,202 B2 | 11/2018 | Sundararajan et al. |

(Continued)

FOREIGN PATENT DOCUMENTS

| CN | 104581758 A | 4/2015 |
| CN | 105940640 A | 9/2016 |

(Continued)

OTHER PUBLICATIONS

International Search Report and Written Opinion issued in International Application No. PCT/EP2018/084357 dated Jul. 31, 2019 (11 pages).

(Continued)

*Primary Examiner* — Benjamin H Elliott, IV
*Assistant Examiner* — Nevena Zecevic Sandhu
(74) *Attorney, Agent, or Firm* — Rothwell, Figg, Ernst & Manbeck, P.C.

(57) ABSTRACT

We generally describe an apparatus (200, 300) for user plane traffic quality analysis in a wireless communication network, the apparatus (200, 300) comprising: an interface configured to be coupled to a user plane probe (214) arranged on a bidirectional user plane traffic flow path of user plane traffic flowing through the wireless communication network between a first terminal (202) and a second terminal (204) of the wireless communication network, and an estimation unit (706) coupled to the interface, wherein the estimation unit (706) is configured to estimate, based on a probing, by the user plane probe (214), of the user plane traffic flowing in a first direction (304) in a first segment (301) of the user plane traffic flow path from the first terminal (202) to the user plane probe (214), a user plane traffic quality of the user plane traffic flowing in a second direction (310) in the first segment (301) from the user plane probe (214) to the first terminal (202), wherein the first direction (304) is opposite (Continued)

to the second direction (310), and wherein the user plane traffic is not testable via the user plane probe (214) in the second direction (310).

23 Claims, 7 Drawing Sheets

(51) Int. Cl.
*H04L 65/80* (2022.01)
*H04W 24/10* (2009.01)
*H04W 28/10* (2009.01)

(56) References Cited

U.S. PATENT DOCUMENTS

| | | | | |
|---|---|---|---|---|
| 2007/0004399 | A1* | 1/2007 | Laiho | H04L 41/16 |
| | | | | 455/423 |
| 2008/0267302 | A1* | 10/2008 | Cai | H04W 24/08 |
| | | | | 375/260 |
| 2009/0239542 | A1* | 9/2009 | Horiuchi | H04L 25/242 |
| | | | | 455/445 |
| 2014/0016487 | A1 | 1/2014 | Dorenbosch | |
| 2015/0009851 | A1* | 1/2015 | Yan | H04L 25/4975 |
| | | | | 370/252 |
| 2016/0359943 | A1 | 12/2016 | Huang et al. | |
| 2017/0149480 | A1* | 5/2017 | Kakishima | H04B 7/024 |
| 2019/0086988 | A1* | 3/2019 | He | G06F 1/3212 |
| 2020/0107205 | A1* | 4/2020 | Yang | H04W 36/0022 |

FOREIGN PATENT DOCUMENTS

| | | |
|---|---|---|
| CN | 108346434 A | 7/2018 |
| CN | 108696403 A | 10/2018 |
| CN | 108923984 A | 11/2018 |

OTHER PUBLICATIONS

IPRP issued in International Application No. PCT/EP2018/084357 dated Feb. 24, 2021 (18 pages).

\* cited by examiner

304, 308: Available audio quality metrics through user plane probing 306, 310: Not available audio quality metrics through user plane probing

TECHNIQUE FOR USER PLANE TRAFFIC QUALITY ANALYSIS

CROSS REFERENCE TO RELATED APPLICATIONS

This application is a 35 U.S.C. § 371 National Stage of International Patent Application No. PCT/EP2018/084357, filed Dec. 11, 2018.

TECHNICAL FIELD

The present invention generally relates to an apparatus, a system and a method for user plane traffic quality analysis in a wireless communication network. The apparatus, the system and the method according to example implementations as described herein may in particular relate to an apparatus, a system and a method for voice quality analysis.

BACKGROUND

The Real-time Transport Protocol (RTP) (RFC 3550 https://tools.ietf.org/html/rfc3550) is a network protocol for delivering audio and video over IP networks. RTP is used in, for example, 4G mobile networks for voice and video telephony (VoLTE, ViLTE, Voice over WiFi). RTP will be used in 5G networks as well for the same purpose(s).

RTP can be used in conjunction with the RTP Control Protocol (RTCP). While RTP generally carries the media streams (for example, audio and/or video), RTCP is used to monitor transmission statistics and quality of service (QoS) of the media streams. Mobile network operators monitor the RTP/RTCP traffic in order to ensure quality of service of the media streams. This may be especially important because the transmission path includes radio network parts as well, where packet loss and other quality degradations may be higher than is usually the case in wired network parts.

The number of monitored audio streams in a mobile network is high and monitored by high capacity traffic probes at the gateway nodes, where all streams may be available.

Prior art can be found, for example, in U.S. Pat. No. 7,796,532 B2, which generally relates to media segment monitoring; US 2004/0066753 A1, which generally relates to a system and a method to monitor RTP streams using RTCP SR/RR packet information; US 2009/0135724 A1, which generally relates to a method and apparatus of RTP Control Protocol (RTCP) processing in Real-time Transport Protocol (RTP) intermediate systems; and in Information and Communication Technologies and Services, volume 12, number 4, 2014, special issue, Petr Matousek et al., which generally relates to "On-line Monitoring of VoIP Quality using IPFIX".

Figure 1:
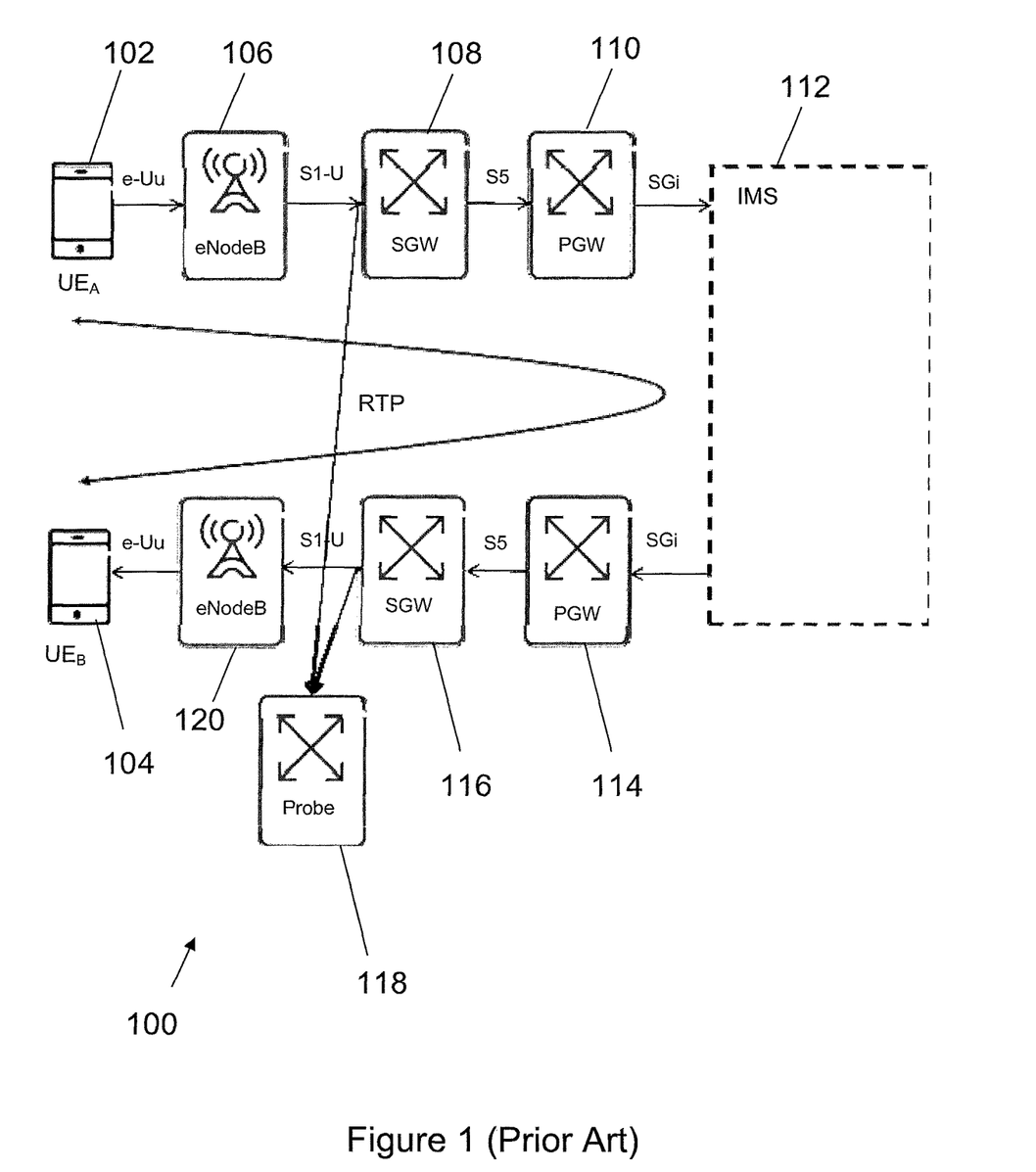
FIG. 1 shows a schematic of a network topology according to the state of the art.

FIG. 1 shows a network topology 100 (in this example a VoLTE network) with user plane probing according to the state of the art.

In this example, user plane traffic flows through the network between a first user equipment 102 and a second user equipment 104. The RTP hereby flows from the first user equipment 102 to the eNodeB 106 and from there via a S1-U interface to a Serving Gateway 108. Furthermore, the data flow continues from the Serving Gateway 108 to the Packet Data Network. Gateway 110 via an S5 interface. The Packet Data Network Gateway 110 is, in this example, coupled to information management system 112, which in turn is coupled to Packet Data Network Gateway 114 via an SGi interface. The Packet Data Network Gateway 114 is further coupled to the Serving Gateway 116 via an S5 interface. The Serving Gateway 116 is coupled to the eNodeB 120, which itself is coupled to the second user equipment 104.

In the example shown in FIG. 1, a probe 118 is used to probe the user plane traffic at respective points between the eNodeBs and the SGWs.

With this generic setup, when analyzing audio quality metrics, the following state of the art options are available:
1. Use of dedicated user equipment, monitoring the streams on $UE_A$ 102 and/or $UE_B$ 104,
    a. End-to-end coverage by monitoring RTP endpoints,
    b. Detailed RTP packet inspection based analysis,
2. RTCP report assessment,
    a. End-to-end coverage provided by RTCP,
3. RTP analysis at Probes,
    a. Detailed RTP packet inspection based analysis,
    b. Large scale monitoring if all RTP sessions are going through the Probe.

SUMMARY

It has been realized that problems with the solutions of the state of the art using only terminal equipment for audio stream monitoring are that:
  no root cause analysis is possible,
  no network wide monitoring is possible, and
    a special application running on every terminal equipment would be needed.

The problems with RTCP report-based analysis provided by user plane probes are that:
  availability of RTCP reports is highly dependent on network setup, and
  availability of RTCP reports is highly dependent on user equipment.

The problems with analyzing RTP streams using user plane probes are that:
  no end-to-end coverage is possible, as the downlink segment between the probe and the UE remains hidden, and
  only partial root cause analysis is possible since, if there are multiple probes on the path, the intermediate segments might be evaluated individually. However, the hidden downlink segment will be missing from the analysis.

Therefore, according to the present disclosure, there is provided an apparatus for user plane traffic quality analysis in a wireless communication network, the apparatus comprising: an interface configured to be coupled to a user plane probe arranged on a bidirectional user plane traffic flow path of user plane traffic flowing through the wireless communication network between a first terminal and a second terminal of the wireless communication network, and an estimation unit coupled to the interface, wherein the estimation unit is configured to estimate, based on a probing, by the user plane probe, of the user plane traffic flowing in a first direction in a first segment of the user plane traffic flow path from the first terminal to the user plane probe, a user plane traffic quality of the user plane traffic flowing in a second direction in the first segment from the user plane probe to the first terminal, wherein the first direction is opposite to the second direction, and wherein the user plane traffic is not testable via the user plane probe in the second direction.

The user plane traffic may hereby relate to audio and/or video traffic. This may mainly be applicable to, for example, real-time, bidirectional traffic types, such as, but not limited to voice and video telephony.

In some examples, the user plane probe may be an RTP probe. Additionally or alternatively, the first terminal may be a user equipment and/or the second terminal may be a user equipment. In some examples, the first terminal may be a user equipment and the second terminal may be a base station, or vice versa.

In some examples, the first direction in the first segment is an uplink direction from the perspective of the first terminal. The second direction in the first segment may be a downlink direction from the perspective of the first terminal.

The apparatus as described herein may not use (or not need to use) RTCP reports as the availability of these reports is highly dependent on network configuration and user equipment vendors.

In some examples, the user plane traffic flowing in the first direction in the first segment and the user plane traffic flowing in the second direction in the first segment are based on the user plane traffic flowing from the first terminal to the second terminal and from the second terminal to the first terminal, respectively.

In some examples, the estimation unit is configured to estimate an end-to-end user plane traffic quality of the user plane traffic flowing from the second terminal to the first terminal based on (i) the estimated user plane traffic quality of the user plane traffic flowing in the second direction in the first segment from the user plane probe to the first terminal and (ii) a probing, by the user plane probe, of the user plane traffic flowing in a second segment of the user plane traffic flow path from the second terminal to the user plane probe.

In some examples, the estimation unit is further configured to estimate an end-to-end user plane traffic quality of the user plane traffic flowing from the first terminal to the second terminal based on (i) an estimated user plane traffic quality of the user plane traffic flowing in the second segment from the user plane probe to the second terminal and (ii) a probing, by the user plane probe, of the user plane traffic flowing in the first segment of the user plane traffic flow path from the first terminal to the user plane probe.

The end-to-end user plane quality may be characterized by a MOS or R-value (ITU-T P.800.1 and G.107). This may be strongly related to the packet level traffic quality parameters, such as, but not limited to RTP-based jitter, packet loss ratio and burst ratio. Formulas and models may be used to describe this relation, but these are not used in the present disclosure as it may in general not be possible to measure these packet parameters by probes at the end point. Instead, the packet level quality parameters may be measured at the edge of the core network in an uplink direction in some examples in both directions. These measurements may be used for estimating the end-to-end quality metrics in both directions, in some examples by using a neural network, as will be further outlined below. The training of the neural network may be based on measuring the end-to-end user plane quality (MOS or R-value) at a limited number of test terminals.

The packet level quality parameters measured in uplink directions may be extended, if available, with radio network data (measured for the second segment, and referring to the downlink direction) to improve accuracy of the estimation.

The probe may report these parameters for each RTP stream for a time window, which may be, for example, 5-10 s wide. The probe reports may contain metrics, in some examples, in both directions for the bidirectional RTP stream.

The interface being configured to be coupled to the user plane probe may hereby refer to the interface being coupleable to the user plane probe.

In some examples, the apparatus is configured to receive, from the user plane probe, a user plane traffic quality-related report indicative of the user plane traffic quality of the user plane traffic, and wherein the estimation unit is configured to perform the estimation of the user plane traffic quality (for example the end-to-end user plane traffic quality) based on the user plane traffic quality-related report. The estimation unit may hereby be configured to estimate the user plane traffic quality of the user plane traffic at the second terminal and/or first terminal and/or, for example, a base station via which traffic between the first and second terminals flows.

The user plane traffic quality-related report may include one or more of the following parameters: packet loss ratio, relative jitter and burst ratio. These parameters in relation to user plane traffic flowing in the first segment of the user plane traffic flow path may be used by the apparatus in order to estimate the user plane traffic quality of the user plane traffic for the first segment in the direction which cannot be tested via the user plane probe.

In some examples of the apparatus, the estimation unit comprises a neural network (which may be coupleable to the user plane probe via the interface), and wherein the estimation of the user plane traffic quality of the user plane traffic is based on an output from the neural network. The neural network may therefore be configured to provide an output for the estimation of the user plane traffic quality (for example voice quality) for the direction of the first segment that cannot be monitored by user plane probing via a said user plane probe.

In some examples of the apparatus, the neural network is configured to receive the user plane traffic quality-related report from the user plane probe via the interface, and to output, based on the received user plane traffic quality-related report, the output for the estimation of the user plane traffic quality of the user plane traffic. As outlined above, the user plane traffic quality-related report may include one or more of packet loss ratio, relative jitter and burst ratio, which may be provided to the neural network for the neural network to provide the output for the estimation of the user plane traffic quality (e.g. the end-to-end user plane traffic quality) of the user plane traffic. The estimation unit may hereby be configured to estimate the user plane traffic quality of the user plane traffic at the second terminal and/or first terminal, and/or, for example, a base station via which traffic between the first and second terminals flows.

In some examples of the apparatus, the neural network is further configured to be trainable based on one or both of (i) one or more user plane traffic quality-related reports relating to one or more dedicated terminals, and (ii) one or more cell quality parameters receivable by the neural network from the wireless communication network. The estimation of the (e.g. end-to-end) user plane traffic quality of the user plane traffic may therefore, in some examples, be performed more precisely in view of the neural network being trained based on the one or more above-indicated user plane traffic quality-related reports relating to one or more dedicated terminals and/or the one or more cell quality parameters receivable by the neural network from the wireless communication network.

The neural network may be trained by a limited number of dedicated (test) terminals (for example user equipment) and test calls carried out with test terminals. The number of test terminals and test calls may be significantly less than the ones for which the quality may be estimated during operation. The test terminals may run an application, which may explicitly measure the experienced end-to-end quality metrics (MOS or R-factor) for the test calls. The probe and terminal data of the test calls may be used as training set for the neural network. During the training, the measured end-to-end quality metric may be compared with the one estimated by the neural network and the coupling weights may be modified in small steps to improve the estimated value also in small steps.

In some examples of the apparatus, the neural network is trainable by continuously updating weights of recurrent neural network connections based on data received from the one or more dedicated terminals. The neural network connections may hereby relate to connections to and/or from the neural network to other parts of the apparatus, and/or the system as will be further described below, and/or the wireless communication network, and/or connections within the neural network itself. The estimation of the (for example end-to-end) user plane traffic quality may therefore, in some examples, be based on the current condition in the wireless communication network in relation to the user plane traffic flow and/or a condition of one or more nodes/terminals (for example one or more user equipment), whereby the current condition may be reflected in the continuously updated weights.

In some examples of the apparatus, the neural network comprises an input layer and an output layer coupled to each other via a hidden layer, wherein the neural network is configured to receive, via the input layer, a first user plane traffic quality-related report and a second user plane traffic quality-related report in relation to an uplink data transmission from the first and second terminals, respectively, wherein a number of input neurons of the input layer is 2*n, where n is a number of probe parameters comprised in the first user plane traffic quality-related report and the second user plane traffic quality-related report, respectively, wherein the hidden layer comprises m hidden-layer neurons, wherein each input neuron is coupled to each hidden-layer neuron, wherein the hidden layer is configured to apply a transformation to data received from the input layer, and wherein the output layer is configured to output the transformed data via output neurons to output the output for the estimation of the (for example end-to-end) user plane traffic quality of the user plane traffic. In some examples, m=2*n.

The neural network may hereby take various user plane traffic quality-related reports into account, in particular, in some examples, to improve estimation of the end-to-end user plane traffic quality.

In some examples of the apparatus, the output layer comprises a first said output neuron in relation to the user plane traffic quality in a downlink direction for the first terminal, and a second said output neuron in relation to the user plane traffic quality in a downlink direction for the second terminal. The apparatus may hereby be configured to estimate a user plane traffic quality for segments to and from the respective terminal for which probing via the user plane probe is not possible.

In some examples of the apparatus, outputs of the output neurons comprise quality metrics for each period of user plane traffic quality-related reporting. The estimation of the (for example end-to-end) user plane traffic quality may therefore, in some examples, be performed continuously.

In some examples, the apparatus is configured to determine, by backpropagation in time (and/or another learning algorithm), couplings of one or both of (i) the input neurons and the hidden-layer neurons, and (ii) the hidden-layer neurons and the output neurons. The coupling of the neurons may therefore be determined based on data or information obtained previously.

In some examples of the apparatus, the neural network comprises a feedback coupling (i) between the output layer and the hidden layer, and/or (ii) between the hidden layer and the input layer, and wherein the neural network is configured to output the output for the estimation of the (for example end-to-end) user plane traffic quality based on previously estimated user plane traffic quality which is fed back to (i) the hidden layer and/or (ii) the input layer via the feedback coupling. The previously estimated user plane traffic quality may relate to previously estimated user plane traffic quality. The feedback coupling to the previous layer may therefore allow for taking into account the effect of the previous reporting period, which may allow for improved estimation of the (for example end-to-end) user plane traffic quality based on previously obtained data and/or previously conducted estimations of the (for example end-to-end) user plane traffic quality.

The feedback coupling may, in some examples, be needed both between the output and hidden layers and between the hidden an input layers. They may both influence the output. By providing the feedback coupling between both the output and hidden layers and between the hidden an input layers, the result may be improved. These coupling weights may also be determined during the training process. The feedback coupling may serve as a kind of memory. Via these couplings, the output of the neural network may depend not only on the input, but also on the output of the previous output of the neural network. In general, RNN may be useful when the input is time sequence data, such as, for example, the probe reports of a media stream.

In some examples of the apparatus, the neural network is configured to be trained by user plane traffic-related metrics reported to the apparatus by a predetermined number of terminals extended with cell-related information provided by the wireless communication network.

As a possible option, the method may be implemented as part of a network analytical system of the wireless network. These systems may collect and correlate call and session related data from multiple data sources, such as core network nodes, radio network nodes, probe data from control and user planes. The cell related radio network parameters may also influence the estimation of the end-to-end quality since they are in correlation. Adding them as input data to the neural network system may make the prediction more accurate.

The cell-related information may relate to one or more of a channel quality indicator, the mean number of active subscribers in the uplink/downlink direction, the relative number of active users in the cell, downlink radio metrics, reference signal received power, RSRP, reference signal received quality, RSRQ, and hybrid automatic repeat request, HARQ.

In some examples, the apparatus further comprises a machine learning unit coupled to the estimation unit (e.g. the neural network), wherein the machine learning unit is configured to receive a user plane traffic quality-related report from the user plane probe and analyze the user plane traffic quality-related report, wherein the estimation, by the estimation unit, of the (for example end-to-end) user plane traffic quality is based on the user plane traffic quality-related report analyzed by the machine learning unit. The machine learning unit may hereby be coupleable to the user plane probe.

In some examples of the apparatus, the estimation unit is configured to perform the estimation of the (for example end-to-end) user plane traffic quality in real-time.

In some examples, the user plane traffic comprises audio traffic, which may comprise voice traffic.

In some examples of the apparatus, the probing of the user plane traffic flowing in the first direction in the first segment by the user plane probe comprises deriving one or more of RTP-based jitter, packet loss metrics and burst ratio (relating to burst transmission). The user plane probe may hereby in particular be an RTP probe.

There is further provided a system comprising the apparatus according to any one of the examples as described throughout the present disclosure, and a said user plane probe coupled to the apparatus.

We further describe a method for user plane traffic quality analysis in a wireless communication network, the method comprising: probing a first segment of a user plane traffic flow path of user plane traffic flowing in a first direction through the wireless communication network between a first node and a second node of the wireless communication network; and estimating, based on the probing, a (for example end-to-end) user plane traffic quality of the user plane traffic flowing in the first segment in a second direction which is opposite to the first direction, wherein the first segment is not testable in the second direction via a said probing. The first node and/or the second node may hereby comprise user equipment.

In some examples, the method further comprises estimating an end-to-end user plane traffic quality of the user plane traffic flowing between the first node and the second node based on (i) the estimated user plane traffic quality and (ii) a user plane traffic probed in a second segment of the user plane traffic flow path, wherein the user plane traffic flow path is comprised of the first and second segments.

In some examples of the method, the estimating of the (for example end-to-end) user plane traffic quality of the user plane traffic is based on analyzing a user plane traffic quality-related report which is indicative of the user plane traffic quality of the user plane traffic flowing in the first segment in the first direction, wherein the user plane traffic quality-related report is generated based on the probing of the first segment.

Further detailed implementations and examples as outlined above in relation to the apparatus and system are equally applicable to the method for user plane traffic quality analysis in a wireless communication network.

We further describe a computer program product comprising program code portions for performing the methods as outlined above when the computer program product is executed on one or more computing devices. The computer program product may, in some examples, be stored on a computer-readable recording medium.

BRIEF DESCRIPTION OF THE DRAWINGS

These and other aspects of the present disclosure will now be further described, by way of example only, with reference to the accompanying figures, wherein like reference numerals refer to like parts throughout, and in which.

DETAILED DESCRIPTION

In the description outlined herein, for purposes of explanation and not limitation, specific details may be set forth, such as a specific network environment in order to provide a thorough understanding of the technique disclosed herein. It will be apparent to one skilled in the art that the technique may be practiced in other embodiments that depart from these specific details. Moreover, while the following embodiments may be primarily described for Long Term Evolution (LTE) and 5G implementations, it is readily apparent that the technique described herein may also be implemented in any other wireless communication network, including a Wireless Local Area Network (WLAN) according to the standard family IEEE 802.11 (for example IEEE 802.11a, g, n or ac; also referred to as Wi-Fi) and/or a Worldwide Interoperability for Microwave Access (WiMAX) according to the standard family IEEE 802.16.

Moreover, those skilled in the art will appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, for example, including an Advanced RISC Machine (ARM). It will also be appreciated that, while the following embodiments are primarily described in context with methods, devices and systems, the invention may also be embodied in a computer program product as well as in a system comprising a computer processor and memory coupled to the processor, wherein the memory is encoded with one or more programs that may perform the services, functions, steps and implement the units disclosed herein.

A method, an apparatus and a system for quality analysis of traffic is described herein. This may be applied in particular for audio (e.g. voice) quality analysis.

With respect to analysis functionality, the following aspects of the analysis may be performed:

Detailed in-depth analysis: compared to the aggregated KPIs of RTCP reports, RTP packet inspection based analysis gives significantly more details on the audio quality.

Root cause analysis: detection of the segment of the network which is responsible for audio quality degradation.

Large scale analysis: the ability to monitor all the audio streams within the network, despite the high traffic load on the monitoring system.

The method, apparatus and system according to the various implementations as described herein may be applied, for example, to VoLTE, VoWiFi, and others.

Methods, apparatuses and systems according to the implementations as described herein may use RTP-based jitter and packet loss metrics calculated by RTP probes, which refer to network segments between the source and the probing points. These RTP-based indicators may then be combined with each other, and, in some examples, with the standard end-to-end RTCP report, and the packet loss/jitter contribution of network segments may be derived using the defined arithmetic operations.

To overcome the limitations of all the state of the art options, the proposed solution as described herein is to use, in some examples, a neural network-based real-time voice quality analytics apparatus, system and method with an automatic learning mechanism, which can estimate the voice quality for the segment that cannot be monitored by user plane probing.

The neural network is, in some examples, trained by audio quality-related reports from a number of dedicated user equipment and by cell quality parameters provided by the network (ex. channel quality indicator, mean number of active subscribers in uplink and/or downlink direction). The neural network may receive audio quality-related reports from the user plane probes and output data used for the prediction of the audio quality metrics of the segment that cannot be monitored.

The audio quality metrics may be estimated in real-time.

The estimated audio quality metrics' granularity may, in some examples, be between 5 and 10 seconds, thereby making cross-domain root cause analysis and troubleshooting possible.

The adaptive learning of the recurrent neural network may be based on a limited number of user equipment spread across the network. The weights of the recurrent neural network connections may be updated continuously based on the received data from the limited number of user equipment.

Figure 2:
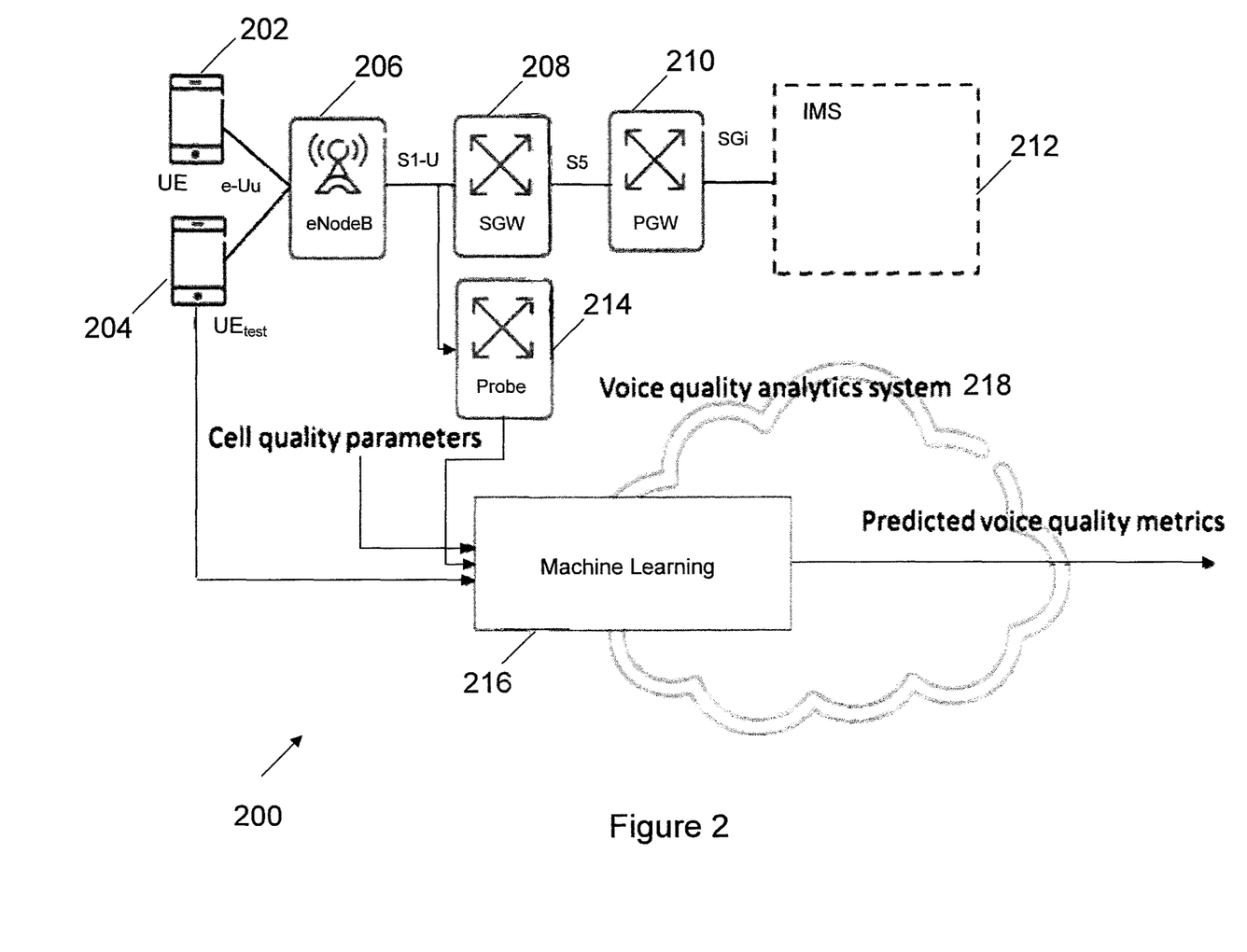
FIG. 2 shows a schematic illustration of a system according to some example implementations as described herein.

FIG. 2 shows a schematic of an apparatus 200, in this example for voice quality analysis, according to some example implementations as described herein.

In this example, user equipment 202 may be in communication with user equipment 204 via the eNodeB 206. The eNodeB 206 is coupled, in this example, to SGW 208 via a S1-U interface. The SGW 208 in turn is coupled to the PGW 210 via an S5 interface. The PGW 210 is coupled to IMS 212 via an SGi interface.

In this example, user plane probe 214 is coupled to the flow path of traffic in between, in this example, the eNodeB 206 and the SGW 208. Other implementations for coupling the probe are possible.

In this example, a machine learning unit 216 is provided. The machine learning unit 216 is coupled with the user equipment 204 such that data may be fed from the user equipment 204 directly to the machine learning unit 216.

In this example, the user plane probe 214 is directly coupled with the machine learning unit 216. Furthermore, in this example, cell quality parameters may be fed directly into the machine learning unit 216. The machine learning unit 216 analyzes, in this example, data obtained via one or more of the user plane probe 214, the cell quality parameters, and the data obtained directly via the user equipment 204, so as to improve subsequent estimation of the end-to-end user plane traffic quality, which cannot be probed by the user plane probe 214.

In this example, the machine learning unit 216 is coupled or integral to a voice quality analytics system 218. The predicted voice quality metrics may then be output for further use.

Figure 3:
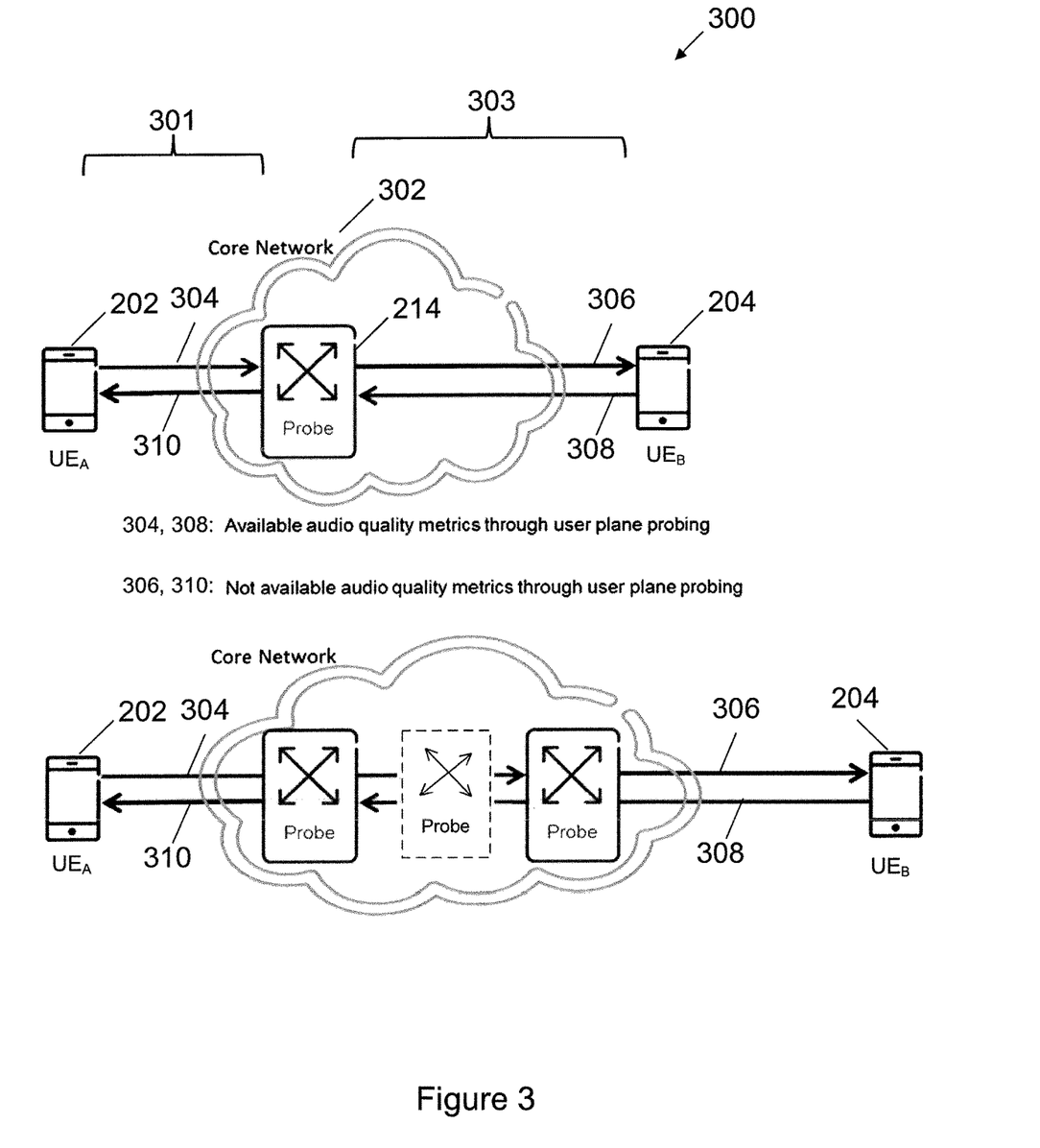
FIG. 3 shows a schematic illustration of audio stream segmentation according to some example implementations as described herein.

FIG. 3 shows a schematic illustration of audio stream/flow segmentation in an apparatus 300 according to some example implementations as described herein. User plane probe 214 is, in this example, implemented in core network 302.

In a network monitoring solution with user plane probing deployed in the network, detailed end-to-end performance analysis based on audio quality metrics may not be possible.

In case of an end-to-end RTP flow between $UE_A$ 202 and $UE_B$ 204, the audio flow can be divided into segments 301 and 303, with directions of the flow indicated via arrows 304, 306, 308 and 310.

The following segments can be defined for downlink audio traffic from $UE_B$ 204 perspective:
1. $UE_A$ 202→user plane probe 214,
2. user plane probe 214→$UE_B$ 204.

The user plane probe 214 can provide granular data of the downlink audio stream for direction 304 of segment 301, but not for direction 306 of segment 303.

The following segments can be defined for uplink audio traffic from $UE_B$ 204 perspective:
1. $UE_B$ 204→user plane probe 214,
2. user plane probe 214→$UE_A$ 202.

The user plane probe 214 can provide granular data of the uplink audio stream for direction 308 of segment 303, but not for direction 310 of segment 301.

The provided uplink data of segment 301 in direction 304 and the uplink data of segment 303 in direction 308 can be used to predict the quality of audio for segment 303 in the downlink direction 306 for $UE_B$ 204 and the quality of audio for segment 301 in the downlink direction 310 for $UE_A$ 202.

As can be seen in the lower part of FIG. 3, user plane probe 214 may be coupled at different locations on the user plane traffic path between user equipment 202 and user equipment 204. Different segments (i.e. different parts of the user plane traffic path between the two user equipment) may therefore be probed, while estimating other varying segments of the user plane traffic path.

As will be appreciated, multiple user plane probes may be implemented in the apparatus, system and method according to the implementations as described herein.

Figure 4:
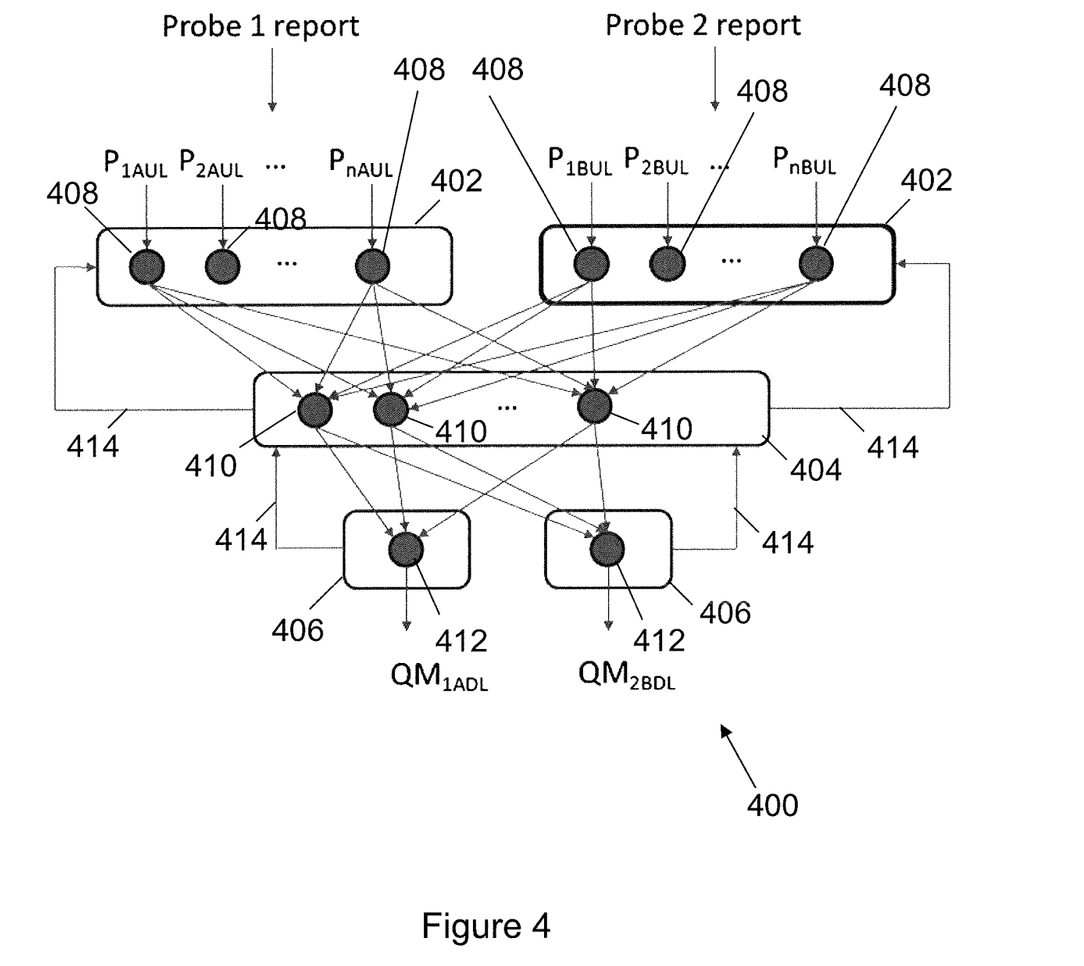
FIG. 4 shows a schematic illustration of a neural network according to some example implementations as described herein.

FIG. 4 shows a schematic illustration of a neural network 400 according to some example implementations as described herein.

For supporting the determination of the quality metrics in downlink direction both for user A and B ($UE_A$ and $UE_B$), a recurrent neural network (RNN) is used. The input of the RNN is, in this example, the normalized probe parameters of the periodic probe reports that are generated for uplink (UL) directions.

Probe reports are generated, in this example, periodically, typically every 5 s, for each RTP flow.

Probe report parameters are, in this example:
P1: packet loss ratio, and/or
P2: relative jitter, and/or
P3: burst ratio.

The number of input neurons 408 of the input layer 402 is, in this example, 2*n, where n is the number of probe parameters.

The hidden layer 404 consists, in this example, of 2*n hidden-layer neurons 410. Each input neuron 408 is connected to each hidden neuron 404.

The output layer 406 consists, in this example, of two neurons 412 in the basic case, when the flow quality is characterized by one quality metric, for example Mean Opinion Score (MOS) or R value.

It will be appreciated that other numbers of neurons are possible for each of the layers. The number of input neurons may hereby be different from the number of hidden-layer neurons. Additionally or alternatively, the number of hidden-layer neurons may be different from the number of output neurons.

The outputs of the neurons, $QM_{1ADL}$ and $QM_{2BDL}$, are, in this example, the end-to-end quality measures, MOS or R value, in this example, for each report period (5 s).

The coupling of the neurons is determined, in this example, by backpropagation in time or another learning algorithm, using in particular training samples.

The RNN is trained, in this example, by audio quality-related metrics reported by a limited number of user equipment extended with cell-related information (for example channel quality indicator, mean number of active subscribers in uplink/downlink direction) provided by the network.

The hidden and output layers include, in this example, a feedback coupling to the previous layer in order to take into account the effect of the previous reporting period. In this way, the output of a reporting period may also be affected by the previous reporting period(s) of the given RTP flow (recurrent network).

Additionally or alternatively, one or more of the following input parameters, for example from radio node reports at the terminal side A and B, may be added as input to the neural network:

P1A: relative number of active users in the cell at terminal A.
DL radio metrics:
　P2A: RSRP
　P3A: RSRQ
　P4A: HARQ DL
and similarly for side B:
P1B: relative number of active users in the cell at terminal B.
DL radio metrics:
　P2B: RSRP
　P3B: RSRQ
　P4B: HARQ DL In some examples, using uplink radio parameters may be less important because their effect may be implicitly included in the uplink RTP probe metrics.

Figure 5:
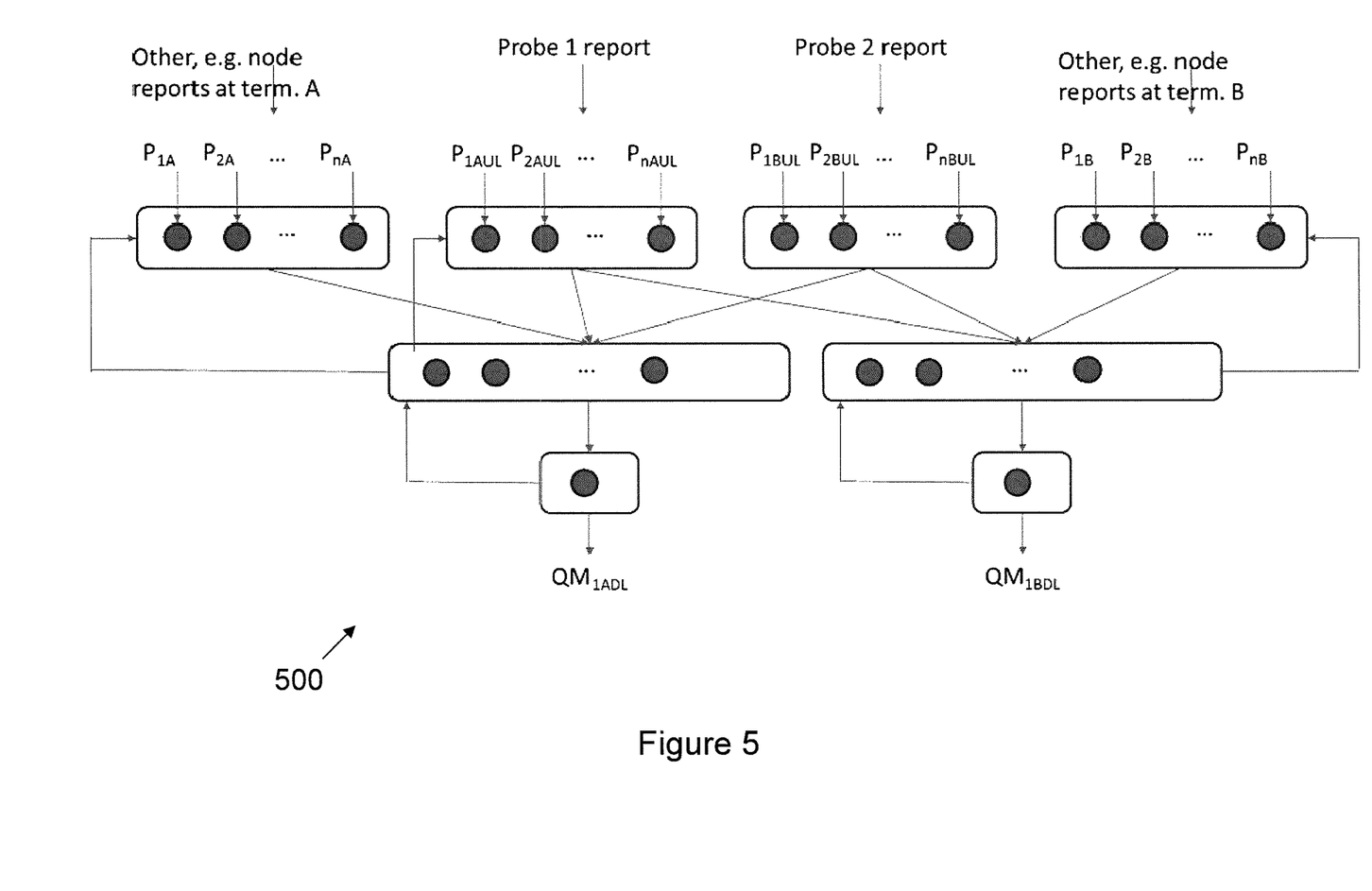
FIG. 5 shows a schematic illustration of a neural network according to some example implementations as described herein.

FIG. 5 shows a schematic illustration of a neural network 500 according to some example implementations as described herein.

The RRN neural network is shown in this example in case of two probe reports being provided to the input layer of the neural network, and additionally downlink radio parameters (in this example node reports at terminals A and B, respectively) being provided to the input layer of the neural network.

Full connections between the neurons in the boxes representing the different layers are shown in FIG. 5 only schematically.

Figure 6:
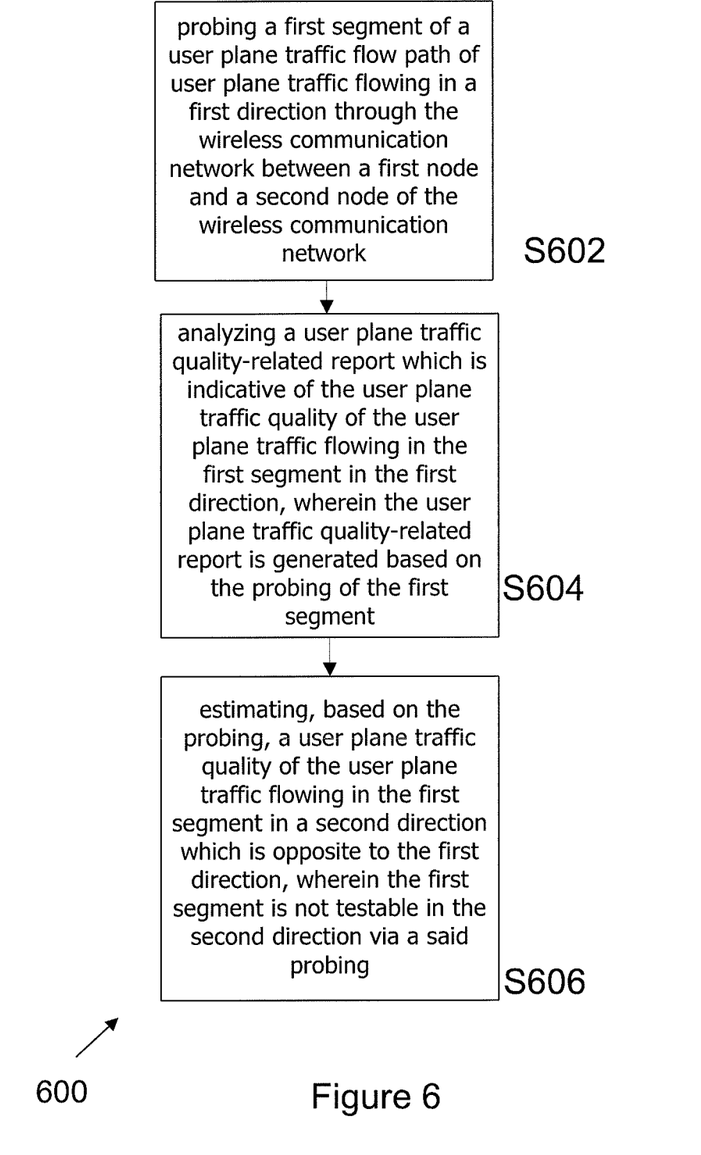
FIG. 6 shows a schematic flow-diagram of a method according to some example implementations as described herein.

FIG. 6 shows a schematic flow-diagram of a method 600 according to some example implementations as described herein.

In this example, the method 600 comprises, at step S602, probing a first segment of a user plane traffic flow path of user plane traffic flowing in a first direction through the wireless communication network between a first node and a second node of the wireless communication network. The first node may hereby relate to a first user equipment. Additionally or alternatively, the second node may relate to a second user equipment.

At step S604, the method 600 comprises analyzing a user plane traffic quality-related report which is indicative of the user plane traffic quality of the user plane traffic flowing in the first direction, wherein the user plane traffic quality-related report is generated based on the probing of the first segment.

At step S606, the method 600 comprises estimating, based on the probing, a (for example end-to-end) user plane traffic quality of the user plane traffic flowing in the first segment in a second direction which is opposite to the first direction, wherein the first segment is not testable in the second direction via a said probing.

Figure 7:
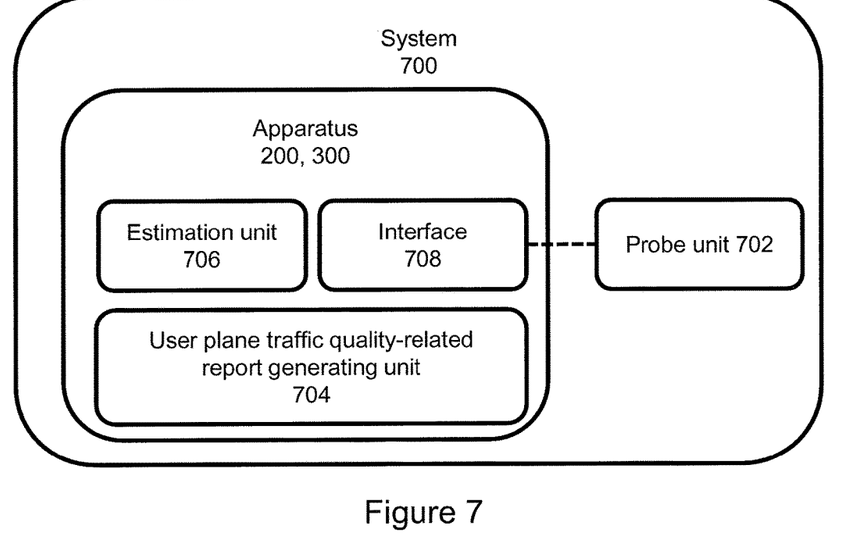
FIG. 7 shows a schematic illustration of a system according to some example implementations as described herein.

FIG. 7 shows a schematic illustration of a system 700 according to some example implementations as described herein.

In this example, the system 700 comprises an apparatus, and a probe unit 702 configured to probe a user plane traffic flow path of user plane traffic flowing through the wireless communication network between a first node (for example user equipment) and a second node (for example user equipment). The probing hereby relates to probing of the first segment of the user plane traffic flow path between the first node and the second node.

In this example, the apparatus comprises a user plane traffic quality-related report generating unit 704 which is configured to generate a user plane traffic quality-related report based on data obtained via the probing of the first segment of the user plane traffic flow path between the first node and the second node performed by the probe unit 702.

The apparatus comprises, in this example, an interface 708 which is configured to be coupled to the probe unit 702.

Furthermore, in this example, the apparatus comprises an estimation unit 706 which is configured to estimate, based on the generated user plane traffic quality-related report, a (for example end-to-end) user plane traffic quality of the user plane traffic, as outlined above.

In some examples, the probe unit 702 and the user plane traffic quality-related report generating unit 704 may be integral to a single unit (for example a single user plane probe).

Figure 8:
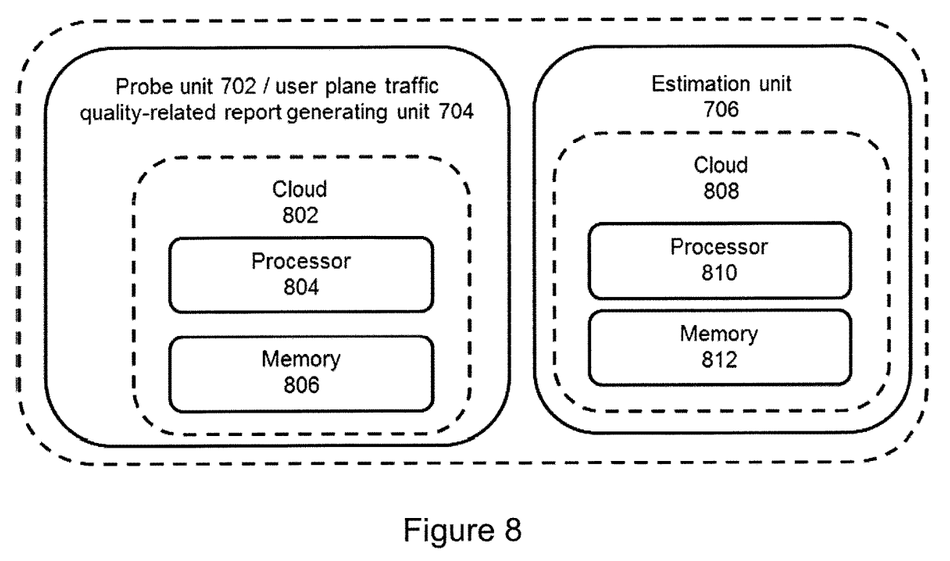
FIG. 8 shows a schematic illustration of a system according to some example implementations as described herein.

FIG. 8 shows a schematic illustration of a system according to some example implementations as described herein. The apparatus according to the examples as outlined herein may be comprised in the system.

In this example, the probe unit 702 and/or the user plane traffic quality-related report generating unit 704 (which may be integral to a single unit) comprises a processor 804, and a memory 806 for storing program code portions executable by the processor 804. The program code portions may allow probing a segment of the user plane traffic path and generating a user plane traffic quality-related report based on the probing. In this example, the processor 804 and the memory 806 are implemented in a cloud computing environment (cloud 802).

In this example, the estimation unit 706 of the apparatus/system comprises a processor 810, and a memory 812 for storing program code portions executable by the processor 810 to perform the above-specified estimation of the user plane traffic quality of user plane traffic. In this example, the processor 820 and the memory 812 are provided in a cloud computing environment (cloud 808).

Example implementations of the method, apparatus and system as described herein eliminate the need for RTCP reports and provide in particular:
　end-to-end analysis for the audio streams (or generally user plane traffic), root cause analyses on an audio stream (or generally user plane traffic) segment level,
predicting the quality of audio stream (or generally user plane traffic) for the segment that cannot be monitored in a particular direction,
audio (or generally user plane traffic) quality analysis for the entire network,
real-time and automated monitoring of the audio (or generally user plane traffic) quality, and
user equipment and network configuration independent analysis.

The present disclosure outlines in particular a method, an apparatus and a system in which an RNN is used in order to determine quality management for unknown segment and direction of an RTP flow, based on the packet level metrics of the available segment and direction.

The input and output parameters of the RNN and the structure of the RNN allow for estimating and outputting user plane traffic quality information for a segment which cannot be probed by a user plane probe in a particular direction based on probing the segment in the opposite direction. Machine learning may be applied in order to improve the estimation.

In some examples, neurons of a layer of the neural network may be coupled which each neuron of a neighboring layer.

RTP probing, DL radio and other parameters as input parameters to the RNN may be used in some examples in order to perform the estimation of the user plane traffic quality of the segment which is not testable in a certain direction via the user plane probe. DL radio input parameters may include, for example, RSRP, RSRQ and HARQ DL.

Methods, apparatuses and systems according to the example implementations as described herein may allow for energy consumption improvements at the network level by using the estimated user plane traffic quality of the segment which cannot be probed by the user plane probe in a certain direction.

It is to be noted that implementations of the method, apparatus and system as described herein may be applied to communications between any two nodes (not only user equipment) in the wireless communication network.

Many advantages of the present invention will be fully understood from the foregoing description, and it will be apparent that various changes may be made in the form, construction and arrangement of the system, units and devices without departing from the scope of the invention and/or without sacrificing all of its advantages. Since the invention can be varied in many ways, it will be recognized that the invention should be limited only by the scope of the following claims.

The invention claimed is:

1. A system comprising:
a user plane probe arranged on a bidirectional user plane traffic flow path of user plane traffic flowing through a wireless communication network between a first terminal and a second terminal of the wireless communication network; and
an apparatus for user plane traffic quality analysis in the wireless communication network, the apparatus comprising:
an interface configured to be coupled to the user plane probe; and
an estimation unit coupled to the interface, wherein
the estimation unit is configured to estimate, based on a probing by the user plane probe of the user plane traffic flowing in a first direction in a first segment of the user plane traffic flow path from the first terminal to the user plane probe, a user plane traffic quality of the user plane traffic flowing in a second direction in the first segment from the user plane probe to the first terminal, wherein
the first direction is opposite to the second direction,
for the user plane traffic, no quality metrics through the user plane probe are available in the second direction,
the estimation unit comprises a neural network,
the estimation of the user plane traffic quality of the user plane traffic is based on an output from the neural network, and
the neural network is configured to receive a first user plane traffic quality-related report in relation to an uplink data transmission from the first terminal.

2. The system of claim 1, wherein the user plane traffic flowing in the first direction in the first segment and the user plane traffic flowing in the second direction in the first segment are based on the user plane traffic flowing from the first terminal to the second terminal and from the second terminal to the first terminal, respectively.

3. The system of claim 1, wherein the estimation unit is configured to estimate an end-to-end user plane traffic quality of the user plane traffic flowing from the second terminal to the first terminal based on (i) the estimated user plane traffic quality of the user plane traffic flowing in the second direction in the first segment from the user plane probe to the first terminal and (ii) a probing, by the user plane probe, of the user plane traffic flowing in a second segment of the user plane traffic flow path from the second terminal to the user plane probe.

4. The system of claim 3, wherein the estimation unit is further configured to estimate an end-to-end user plane traffic quality of the user plane traffic flowing from the first terminal to the second terminal based on (i) an estimated user plane traffic quality of the user plane traffic flowing in the second segment from the user plane probe to the second terminal and (ii) a probing, by the user plane probe, of the user plane traffic flowing in the first segment of the user plane traffic flow path from the first terminal to the user plane probe.

5. The system of claim 1, wherein the apparatus is configured to receive, from the user plane probe, a user plane traffic quality-related report indicative of the user plane traffic quality of the user plane traffic, and wherein the estimation unit is configured to perform the estimation of the user plane traffic quality of the user plane traffic based on the user plane traffic quality-related report.

6. The system of claim 1, wherein the neural network is further configured to be trainable based on one or both of (i) one or more user plane traffic quality-related reports relating to one or more dedicated terminals, and (ii) one or more cell quality parameters receivable by the neural network from the wireless communication network.

7. The system of claim 1, wherein
the neural network comprises an input layer and an output layer coupled to each other via a hidden layer,
the neural network is configured to receive, via the input layer, a second user plane traffic quality-related report in relation to an uplink data transmission from the second terminals,
a number of input neurons of the input layer is 2*n, where n is a number of probe parameters comprised in the first user plane traffic quality-related report and the second user plane traffic quality-related report, respectively,
the hidden layer comprises m hidden-layer neurons, wherein each input neuron is coupled to each hidden-layer neuron, wherein the hidden layer is configured to apply a transformation to data received from the input layer, and the output layer is configured to output the transformed data via output neurons to output the output for the estimation of the user plane traffic quality of the user plane traffic.

8. The system of claim 7, wherein the output layer comprises a first said output neuron in relation to the user plane traffic quality in a downlink direction for the first terminal, and a second said output neuron in relation to the user plane traffic quality in a downlink direction for the second terminal.

9. The system of claim 7, wherein outputs of the output neurons comprise the quality metrics for each period of user plane traffic quality-related reporting.

10. The system of claim 1, wherein the neural network is configured to be trained by user plane traffic-related metrics reported to the apparatus by a predetermined number of terminals extended with cell-related information provided by the wireless communication network.

11. The system of claim 10, wherein the cell-related information comprises one or more of a relative number of active users in the cell, downlink radio metrics, reference signal received power, RSRP, reference signal received quality, RSRQ, and hybrid automatic repeat request, HARQ.

12. The system of claim 1, further comprising a machine learning unit coupled to the estimation unit, wherein the machine learning unit is configured to receive a user plane traffic quality-related report from the user plane probe via the interface and analyze the user plane traffic quality-related report, wherein the estimation, by the estimation unit, of the user plane traffic quality of the user plane traffic is based on the user plane traffic quality-related report analyzed by the machine learning unit.

13. The system of claim 1, wherein the estimation unit is configured to perform the estimation of the user plane traffic quality of the user plane traffic in real-time.

14. The system of claim 1, wherein the user plane traffic comprises audio traffic.

15. The system of claim 1, wherein probing the user plane traffic flowing in the first direction in the first segment by the user plane probe comprises deriving one or more of real-time transport protocol (RTP) based jitter, packet loss metrics and burst ratio.

16. The system of claim 1, wherein
the user plane probe is separate from the first terminal and the second terminal, and
the user plane probe is coupled to a flow path of traffic in between a base station and a serving gateway of the wireless communication network, wherein the base station serves the first terminal and the second terminal.

17. The system of claim 1, wherein
the neural network comprises an input layer and an output layer coupled to each other via a hidden layer,
the neural network is configured to receive, via the input layer, a second user plane traffic quality-related report in relation to an uplink data transmission from the second terminal.

18. The system of claim 17, wherein
the input layer comprises a number of input neurons, and
the number of input neurons in the input layer is a function of a number of probe parameters comprised in the first user plane traffic quality-related report.

19. The system of claim 18, wherein
the hidden layer comprises m hidden-layer neurons, wherein each input neuron is coupled to each hidden-layer neuron,
the hidden layer is configured to apply a transformation to data received from the input layer, and
the output layer is configured to output the transformed data via output neurons to output the output for the estimation of the user plane traffic quality of the user plane traffic.

20. A method for user plane traffic quality analysis in a wireless communication network, the method being performed by a system comprising: i) a user plane probe arranged on a bidirectional user plane traffic flow path of user plane traffic flowing through the wireless communication network between a first terminal and a second terminal of the wireless communication network; and ii) an apparatus for the user plane traffic quality analysis in the wireless communication network, the apparatus comprising: i) an interface configured to be coupled to the user plane probe and ii) an estimation unit coupled to the interface, the method comprising:

probing the user plane traffic flowing in a first direction in a first segment of the user plane traffic flow path from the first terminal to the user plane probe; and estimating, by the estimation unit and based on the probing by the user plane probe, a user plane traffic quality of the user plane traffic flowing in a second direction in the first segment from the user plane probe to the first terminal, wherein the first direction is opposite to the second direction, for the user plane traffic, no quality metrics through the user plane probe are available in the second direction, the estimation unit comprises a neural network, the estimation of the user plane traffic quality of the user plane traffic is based on an output from the neural network, and the neural network is configured to receive a first user plane traffic quality-related report in relation to an uplink data transmission from the first terminal.

21. The method of claim 20, further comprising estimating an end-to-end user plane traffic quality of the user plane traffic flowing from the second terminal to the first terminal based on (i) the estimated user plane traffic quality of the user plane traffic flowing in the second direction in the first segment from the user plane probe to the first terminal and (ii) probing, by the user plane probe, of the user plane traffic flowing in a second segment of the user plane traffic flow path from the second terminal to the user plane probe.

22. The method of claim 20, wherein the system further comprises a machine learning unit coupled to the estimation unit, wherein the machine learning unit receives a user plane traffic quality-related report from the user plane probe via the interface, and wherein the estimating of the user plane traffic quality of the user plane traffic is based on analyzing the user plane traffic quality-related report which is indicative of the user plane traffic quality of the user plane traffic flowing in the first segment in the first direction.

23. A computer program product comprising a non-transitory computer readable medium storing a computer program comprising instructions which, when the program is executed by a computer, cause the computer to perform the method of claim 20.

* * * * *